United States Patent [19]
Bredart et al.

[11] 3,980,993
[45] Sept. 14, 1976

[54] HIGH-SPEED/LOW-SPEED INTERFACE FOR DATA PROCESSING SYSTEMS

[75] Inventors: Guy Bredart, Lessines; Alain Gilot, Feluy, both of Belgium

[73] Assignee: Burroughs Corporation, Detroit, Mich.

[22] Filed: Oct. 17, 1974

[21] Appl. No.: 515,693

[52] U.S. Cl. .................................... 340/172.5
[51] Int. Cl.² .................. G06F 5/06; G06F 3/00
[58] Field of Search .......................... 340/172.5

[56] References Cited
UNITED STATES PATENTS

| | | | |
|---|---|---|---|
| 3,373,418 | 3/1968 | Chan | 340/172.5 |
| 3,696,338 | 10/1972 | Preiss | 340/172.5 |
| 3,753,236 | 8/1973 | Flynn | 340/172.5 |

Primary Examiner—Gareth D. Shaw
Assistant Examiner—C. T. Bartz
Attorney, Agent, or Firm—Richard A. Jordan; Benjamin J. Barish; William B. Penn

[57] ABSTRACT

Described is a high-speed/low-speed interface for data processing systems which interface may be implemented on a single LSI MOS chip having a first portion fabricated to include high-speed circuitry to be clocked by a high-speed clock, a second portion fabricated to include low-speed circuitry to be clocked by a low-speed clock, and a third portion formed to include interface circuitry for transferring the data between the other two portions. The described embodiment relates to a two-phase clock system in which the high-speed clocks have a fixed phase relationship to the low-speed clocks and have a pulse repetition frequency which is a whole number multiple of the low-speed clocks. The described single chip may be adapted for one-speed applications by merely connecting together the corresponding phases of the high-speed and low-speed clock input terminals.

19 Claims, 8 Drawing Figures

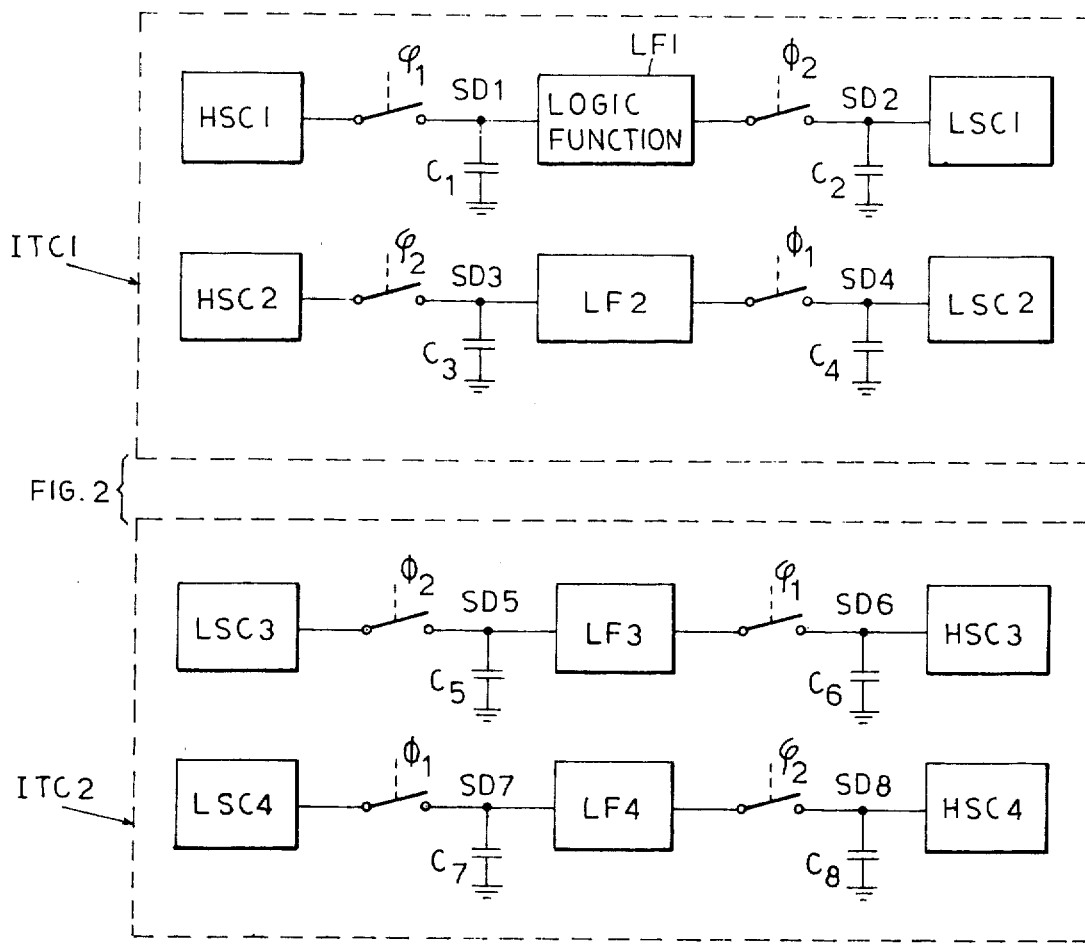
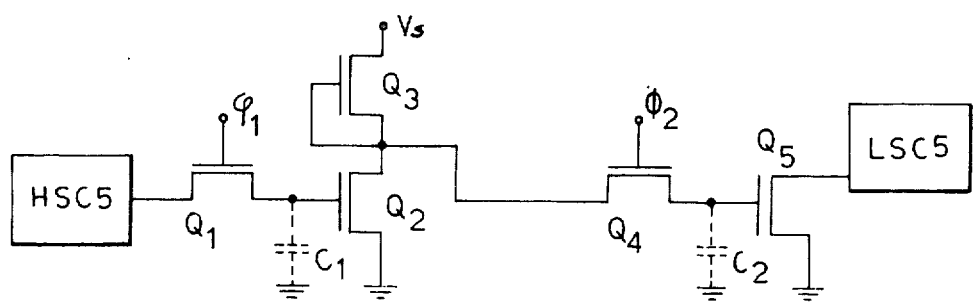
FIG. 5

3,980,993

HIGH-SPEED/LOW-SPEED INTERFACE FOR DATA PROCESSING SYSTEMS

BACKGROUND OF THE INVENTION

The present invention relates to data processing systems, and particularly to those which include units operating at different clock speeds and interfaces for implementing the transfer of data between such units.

Data processing systems frequently include a processor operating at a high clock speed (e.g. 1 MHz) and a batch of controllers or terminals at least some of which operate at a much lower clock speed (e.g. 250 KHz). To implement the transfer of data between circuits operating at different speeds, various interface buffering arrangements are usually provided, but these add to the cost and complexity of the system.

In addition, there is an increasing tendency to fabricate the circuits of the various units on separate large-scale-integration (LSI) chips using, for example, metal-oxide-semiconductor (MOS) transistors. The physical size of each chip depends to a great extent on the clock speed of its respective circuitry. Higher speeds require larger size components and therefore lower packing densities. However, lower packing densities are undesirable since they decrease yield, increase costs, and adversely affect power dissipation and operating speed.

Further, because of the substantial expense of designing and producing single-chip LSI circuits, it is desirable to design each chip for as many different applications as possible, such that the chip may be tailored for any particular application by merely making the appropriate connections to its input pins or terminals.

BRIEF SUMMARY OF THE INVENTION

An object of the present invention is to provide interface circuitry for a data processing system having advantages in the above respects.

More particularly, an important object of the present invention is to provide a single integrated-circuit chip which can be used to interface both high-speed and low-speed circuits.

A further object is to provide a single integrated-circuit chip having its major portion fabricated to include low-speed circuitry, with interface circuitry for interfacing same with high-speed circuitry also fabricated on the chip.

A further object of the invention is to provide a single integrated-circuit chip of the foregoing type which can be easily adapted for use only with low-speed clocks by merely making appropriate jumper connections to its external input terminals.

According to the invention, there is provided a single integrated-circuit chip, comprising a first portion fabricated to include high-speed circuitry designed to be clocked by a high-speed clock, a second portion fabricated to include low-speed circuitry designed to be clocked by a low-speed clock, and a third portion formed to include interface circuitry for implementing the transfer of data between the high-speed and low-speed circuitries. The interface circuitry includes a first sampling device connected to one, e.g. the high-speed, circuitry to be clocked therewith, a first storage device connected to receive the output of the first sampling device, a second sampling device connected to the other, e.g. the low-speed, circuitry to be clocked therewith, and a second storage device connected to receive the output of the second sampling device. The chip further includes a high-speed input terminal for the high-speed clocks and a low-speed terminal for the low-speed clocks, the high-speed clocks having a fixed phase relationship to the low-speed clocks and having a pulse repetition frequency which is a whole number multiple thereof.

The invention is particularly useful for producing single integrator-circuit chips for interfacing high-speed circuitry designed to be clocked by a plurality of high-speed multi-phase clocks, and low-speed circuitry designed to be clocked by a plurality of low-speed multi-phase clocks.

More particularly, the invention is described below with respect to a two-phase clock system wherein the high-speed circuitry is to be clocked by a pair of high-speed two-phase clocks, and the low-speed circuitry is to be clocked by a pair of low-speed two-phase clocks. In such an arrangement the interface circuitry further includes a third sampling device, a third storage device connected to receive the output thereof, a fourth sampling device, and a fourth storage device connected to receive the output thereof. The first and third sampling devices are connected to be clocked by the two-phase clocks of one, e.g. the high-speed, circuitry, and the second and fourth sampling devices are connected to be clocked by the two-phase clocks of the other, e.g. the low-speed, circuitry. The chip further includes a pair of high-speed input terminals one for each phase of the high-speed two-phase clocks, and a pair of low-speed input terminals one for each phase of the low-speed two-phase clocks.

In the two-phase clock configuration, which is the preferred embodiment described below, the interval between the two clock phases is the working period in which logical operations may be performed, the first clock phase being the sampling or storing clock which closes the working period, and the second clock phase being the updating clock which opens the next working period.

According to a further feature of the described embodiment, the high-speed and low-speed circuits are designed to be clocked respectively by two-phase high-speed clocks $\phi_1$, $\phi_2$, and two-phase low-speed clocks $\phi_1$, $\phi_2$, having the following relationships:

a. $T_1 \geq T_I$
b. $T_2 \geq T_{II}$
c. $T_3 \geq T_{III}$
d. $T_4 \geq T_{IV}$ wherein:

$T_1$ = dead time from end of $\phi_1$, to start of $\phi_2$
$T_2$ = shortest time between start of $\phi_1$, and end of $\phi_2$
$T_3$ = dead time from end of $\phi_2$ and start of $\phi_1$
$T_4$ = shortest time between start of $\phi_1$, and start of $\phi_2$ and:

$T_I$ = shortest dead time between high-speed clock phases 1 and 2 (i.e. between end of phase 1 and start of phase 2)
$T_{II}$ = time between start of one phase and end of other phase
$T_{III} = T_I$
$T_{IV}$ = time between start of one phase and start of other phase.

The invention is particularly useful in making single integrated-circuit chips wherein the major portion of the chip is fabricated to include low-speed circuitry. This major portion can therefore be constructed of the higher packing density permitted by low-speed circuitry, thereby minimizing the overall physical chip size.

The single integrated-circuit chip described above constructed for two-speed operation may be adapted for one-speed operation by merely including a pair of jumper wires each connecting together the corresponding phases of the high-speed and low-speed input terminals.

Another important advantage of the invention is that it can be easily implemented by LSI MOS circuit techniques, wherein sampling devices are MOS transistors and the storage devices are constituted by the insulated gates of further MOS transistors. The interface circuitry would also include MOS logic functional units between one or more of the sampling devices and their respective storage devices.

BRIEF DESCRIPTION OF THE DRAWINGS

The invention is herein described, by way of example only, with reference to the accompanying drawings, wherein:

FIG. 2 illustrates in generalized form interface circuitry fabricated in the chip of FIG. 1;

FIG. 5 illustrates one form of MOS-transistor-implemented circuitry which may be used in the interface circuitry of FIG. 2;

DESCRIPTION OF THE PREFERRED EMBODIMENT

Figure 1:
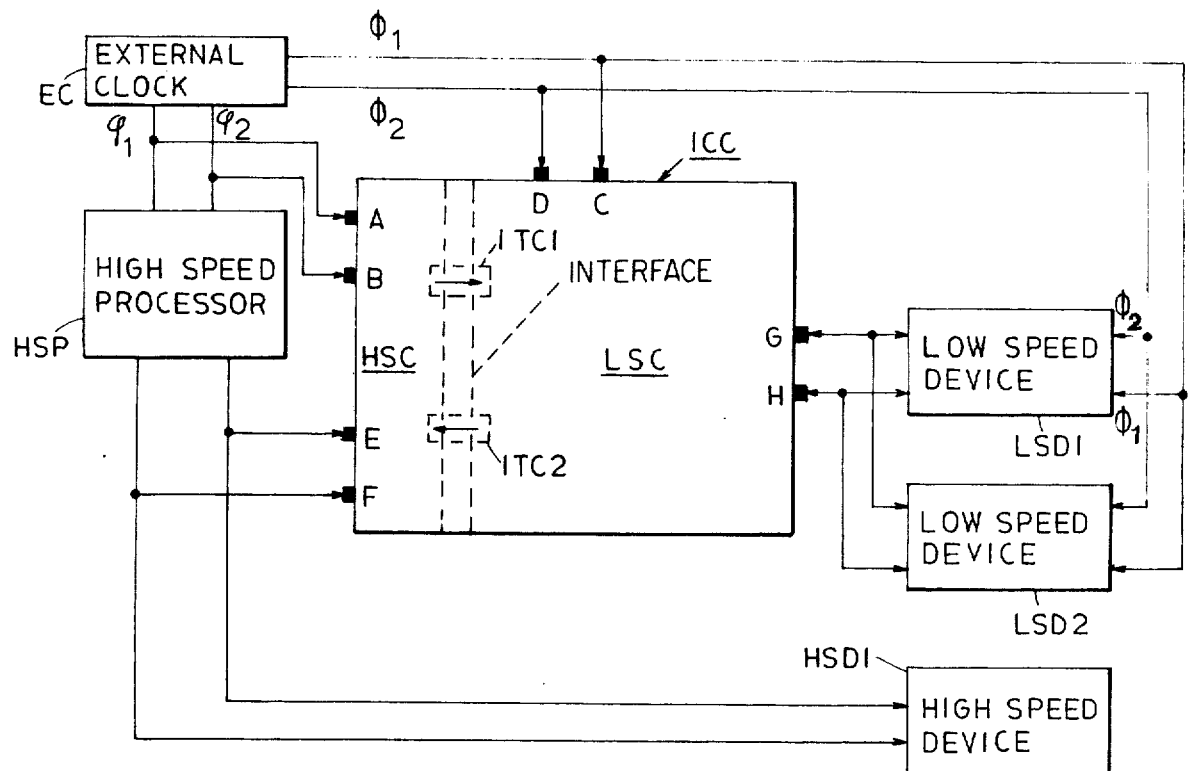
FIG. 1 is a block diagram illustrating a data processing system including a single integrated-circuit chip constructed in accordance with the invention for interfacing a two-phase high-speed processor with two-phase low-speed devices.

The invention is described below with reference to the preferred embodiment illustrated in FIG. 1, in which a high-speed Processor HSP operating at a high clock speed (e.g. 1 MHz) transfers data to and from a plurality of input/output devices one or more of which operate at the high clock speed of the Processor, and others of which operate at a lower clock speed. FIG. 1 illustrates for purposes of example one such high-speed device HSD1 and two such lower-speed devices LSD1 and LSD2, for example teleprints operating at a clock speed of 250 KHz.

The high-speed Processor HSP is interfaced with the low-speed devices by means of a single integrated-circuit chip ICC. Chip ICC has a first portion HSC fabricated to include high-speed circuitry, another portion LSC fabricated to include low-speed circuitry, and an interface portion ITC implementing the transfer of data between the two latter portions. As shown in FIG. 1, the major part of the chip is fabricated of the low-speed circuitry LSC. The transfer of data from the high-speed portion HSC to the low-speed portion LSC is effected via high-speed to low-speed interface circuitry schematically represented by block ITC1 in FIG. 1; and the transfer in the reverse direction, from low-speed to high-speed, is schematically represented by interface block ITC2.

The provision of the interface transfer circuitry on the single chip enables the chip to be designed so that the high-speed portion HSC sees only the high-speed clocks, and the low-speed portion LSC sees only the low-speed clocks; and since the latter portion constitutes the major surface area of the chip, as schematically shown in FIG. 1, it can be designed with greater packing density as permitted by low-speed circuitry, thereby minimizing the overall chip size.

The circuitry used in the examples illustrated in the drawings and described below is one based on MOS two-phase ratioed logic. Such MOS two-phase circuitry is well known, and is described for example in the book "MOS Transistor Circuits," prepared by the Engineering Staff of American Microsystems, Inc., and published by Van Nostrand Reinhold Company, New York, 1972, pages 260–273. In the system described herein, one phase clock is used to fix the sampling time, and the other phase clock is used to fix the updating time, the interval between the two clocks being the working period.

In the system of FIG. 1, all the clock pulses are supplied by an external clock EC. The high-speed two-phase clocks $\phi_1$, $\phi_2$ are fed by the external clock to the high-speed device Processor HSP, to the high-speed device HSD1, and also to the high-speed input terminals A, B of the single integrated-circuit chip ICC. The low-speed two-phase clocks $\phi_1$, $\phi_2$ are fed by the external clock EC to the low-speed devices LSD1, LSD2, and also to the low-speed input terminals C, D of the integrated-circuit chip ICC.

The integrated-circuit chip ICC includes data terminals schematically shown at E, F for inputting and outputting data with respect to the high-speed Processor HSP and the high-speed section HSC of the chip under the control of the high-speed clocks $\phi_1$, $\phi_2$; and further data terminals G, H for inputting and outputting data with respect to the low-speed section LSC of the chip and the low-speed devices LSD1, LSD2 under the control of the low-speed clocks $\phi_1$, $\phi_2$.

As indicated earlier, the transfer of data in the direction from the high-speed side to the low-speed side of the chip is effected by means of interface circuitry schematically represented by block ITC1 in FIG. 1, and the transfer of data in the reverse direction is effected by interface circuitry schematically represented by block ITC2. The foregoing interface circuitries schematically shown by blocks ITC1 and ITC2 are illustrated more particularly but in generalized form in FIG. 2.

In its generalized form, the ITC1 circuitry for transferring data from the high-speed side to the low-speed side of the chip includes a sampling device shown schematically by switch SD1 connected to high-speed circuitry HSC1 and clocked by high-speed clock $\phi_1$, a first storage device constituted by capacitor C1 connected to receive and store the output of sampling device SD1, a second sampling device SD2 clocked by the low-speed clock $\phi_2$, and a second storage device constituted by capacitor C2 connected to receive and store the output of sampling device SD2 before transmission to the low-speed circuitry LSC1. The transfer circuit may also include logic functional units, schematically indicated by block LF1, which perform logic functions between clock pulses. For example, logic function unit LF1 may be an inverter for inverting the data, or a double-inverter for effecting a delay.

Interface circuitry ITC1 also includes a further sampling device SD3 connected to high-speed circuitry HSC2 and clocked by the high-speed clock $\phi_2$, a storage device constituted by capacitor C3 for receiving and storing the output of sampling device SD3, a logic functional unit LF2 (optional) connected to receive the output of capacitor C3, a further sampling device SD4 clocked by the low-speed clock $\phi_1$, and a further storage device constituted by capacitor C4 connected to receive and store the output of sampling device SD4 before transmission to the low-speed circuitry LSC2.

Interface circuitry ITC2 for transferring the data in the reverse direction, i.e., the low-speed side LSC of the chip to the high-speed side HSC, includes a sampling device SD5 connected to low-speed circuitry LSC3 and clocked by the low-speed clock $\phi_2$, a storage capacitor C5 connected to receive the output of sampling device SD5, a logic functional unit LF3, a further sampling device SD6 clocked by the high-speed clock $\phi_1$, and a storage capacitor C6 connected to receive the output of sampling device SD6 before transmission to the high-speed circuitry HSC3. Interface circuitry ITC2 includes a further sampling device SD7 connected to low-speed circuitry LSC4 and clocked by the low-speed clock $\phi_1$, a storage capacitor C7, a logic functional unit LF4, a further sampling device SD8 clocked by the high-speed clock $\phi_2$, and a storage capacitor C8 coupled to the high-speed circuitry HSC4.

From the foregoing, it will be seen that in all the interface circuits a sampling device clocked by one phase clock of one speed is followed by a sampling device clocked by the other phase clock (not the same phase clock) of the other speed. In other words, in each of the transfer circuits, whether in the high-speed to low-speed direction, or in the opposite direction, each sampling device of one speed is never followed by a sampling device clocked by the same phase clock of the other speed, but is rather followed by a sampling device clocked by the other phase clock of the other speed.

The high-speed clocks $\phi_1$, $\phi_2$ must have a fixed phase relationship to the low-speed clocks $\phi_1$, $\phi_2$ and a pulse repetition frequency which is on integer, i.e. a whole number multiple, of the low-speed clocks.

Figure 3:
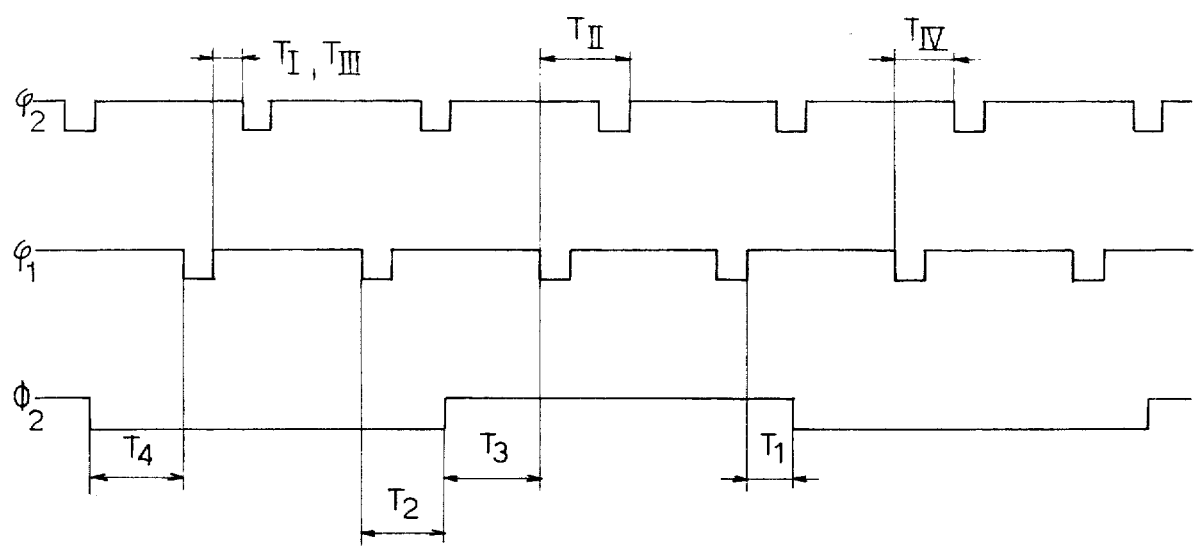
FIG. 3 is a timing diagram showing the phase relationships of the two-phase high-speed and low-speed clocks in the interface circuitry of FIG. 2.

FIG. 3 illustrates the relationships which all the clocks should have, namely:

a. $T_1 \geq T_I$
b. $T_2 \geq T_{II}$
c. $T_3 \geq T_{III}$
d. $T_4 \geq T_{IV}$ wherein:

$T_1$ = dead time from end of $\phi_1$, to start of $\phi_2$
$T_2$ = shortest time between start of $\phi_1$, and end of $\phi_2$
$T_3$ = dead time from end of $\phi_2$ and start of $\phi_1$
$T_4$ = shortest time between start of $\phi_1$, and start of $\phi_2$ and:

$T_I$ = shortest dead time between high-speed clock phases 1 and 2 (i.e. between end of phase 1 and start of phase 2)
$T_{II}$ = time between start of one phase and end of other phase
$T_{III} = T_I$
$T_{IV}$ = time between start of one phase and start of other phase.

The foregoing relationships do not impose superior performances to the interface circuit than normally required for the high-speed and low-speed circuits, respectively. That is to say, the foregoing relationships do not impose shorter working time periods for the logic units in the transfer circuit to function than normally required; the logic units in the transfer circuit need therefore act only as fast as the high-speed clocks.

Further, since the sampling device operated by one phase clock of one speed is always followed by a sampling device operated by the other phase clock of the other speed, and not by the same phase clock of the other speed, the chip may be easily converted for use in single-speed applications by merely connecting together the corresponding phases of the input terminals for the two speed clocks. This is particularly illustrated in FIG. 4, wherein it will be seen that terminal A for high-speed clock $\phi_1$ is connected to terminal C of the low-speed clock $\phi_1$ by means of jumper-wire JW1; and terminal B for the high-speed clock $\phi_2$ is connected to terminal D for the low-speed clock $\phi_2$ by jumper-wire JW2. When so connected, the complete integrated-circuit chip ICC will operate at a single clock speed, normally the low-speed clocks $\phi_1$, $\phi_2$, and therefore the same chip may be used in applications involving only the one-speed clocks $\phi_1$, $\phi_2$.

A further important advantage of the present invention is that the high-speed/low-speed interface chip may be easily implemented by MOS LSI fabrication techniques. Thus, the sampling devices may be constituted of MOS transistors turned-on by applying the respective clocks to their gates, and the storage devices may be constituted also of MOS transistors storing the sampled data by the inherent capacitance between their insulated gates and their source and drain electrodes. MOS circuitry can also be used for the logic units performing logical functions in the working periods between the two-phase clocks.

This is more particularly illustrated in FIG. 5 showing a MOS implementation of the high-speed/low-speed interface circuitry controlled by the high-speed clocks $\phi_1$ and the low-speed clocks $\phi_2$, it being appreciated that similar techniques could be used with respect to the high-speed clocks $\phi_2$ and the low-speed clocks $\phi_1$, as well as with respect to the low-speed to high-speed interface circuitry. Thus, as shown in FIG. 5, the data pulses from the high-speed circuitry HSC5 are applied to MOS transistor Q1, while the high-speed clocks $\phi_1$ are applied to the gate of that transistor to sample the data under the control of the high-speed clock pulses $\phi_1$. The data pulses are thus sampled by transistor Q1, and the samples are stored by the inherent capacitance (represented in broken lines by capacitor C1) between the gate of MOS transistor Q2 and its source and drain electrodes. Transistor Q2 functions as an inverter. It is supplied by voltage source Vs via MOS transistor Q3 serving as a load device and having its gate biased by a connection to the output junction K between transistors Q2 and Q3.

The sampled, inverted data signals are fed from output junction K to MOS transistor Q4 which is gated by the low-speed clocks $\phi_2$, and the sampled outputs of the latter transistor are stored by the inherent capacitance (represented in broken lines by capacitor C2) between the gate of MOS transistor Q5 and its source and drain electrodes, before being applied to the low-speed circuitry LSC5.

As noted above, the working period for performing logical operations is the interval between the two phase clocks, the first phase clock serving as the sampling or strobing clock which closes the working period, and the second phase clock serving as the updating clock which opens the next working period.

Figure 6:
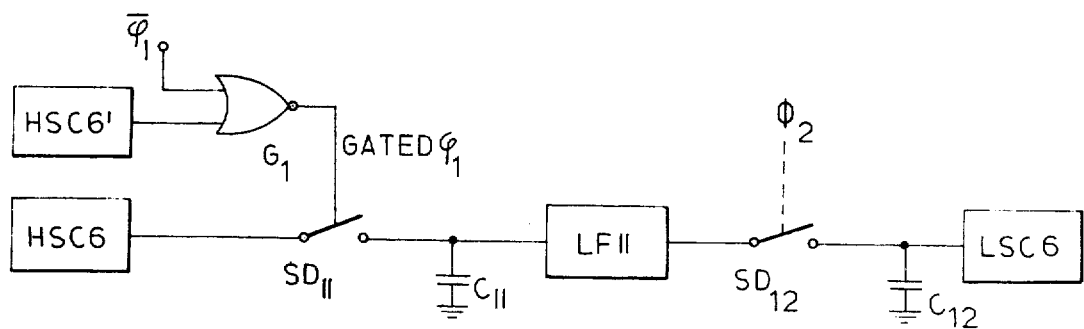
FIGS. 6 and 7 illustrate variations which may be used in the interface circuitry.
Figure 7:
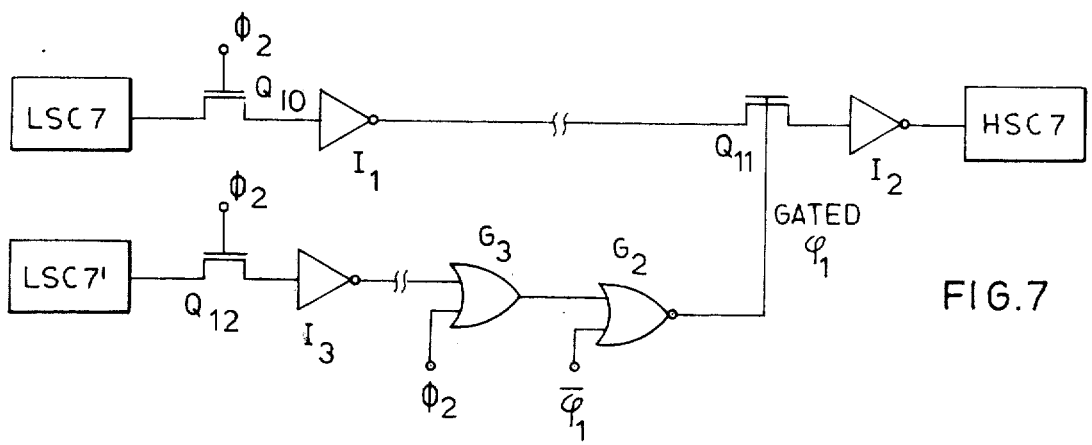

FIGS. 6 and 7 illustrate possible variations in the interface circuitry which can be used in order to prevent data from being picked up by the high-speed sampling device clocked by $\phi_1$ too early after the leading edge of the low-speed clock $\phi_2$. In these circuits, the high-speed clocks $\phi_1$ are gated so that the first two clocks will be skipped, as shown by the timing diagram in FIG. 8.

Thus, FIG. 6 illustrates in generalized form a high-speed to low-speed interface configuration wherein the high-speed sampling device SD11 connected to receive data from the high-speed circuitry HSC6 is gated by the high-speed clock $\phi_1$ supplied from NOR-gate $G_1$ having a $\overline{\phi_1}$ (absence of a $\phi_1$ clock) input, and another input from high-speed circuitry HSC6'. The output of sampling device SD11 is stored in capacitor C11, and after passing through logic functional unit LF11, it is sampled in sampling device SD12 gated by the low-speed clock $\phi_2$. The output of sampling device SD12 is stored in capacitor C12 before transmission to low-speed circuitry LSC6.

Figure 8:
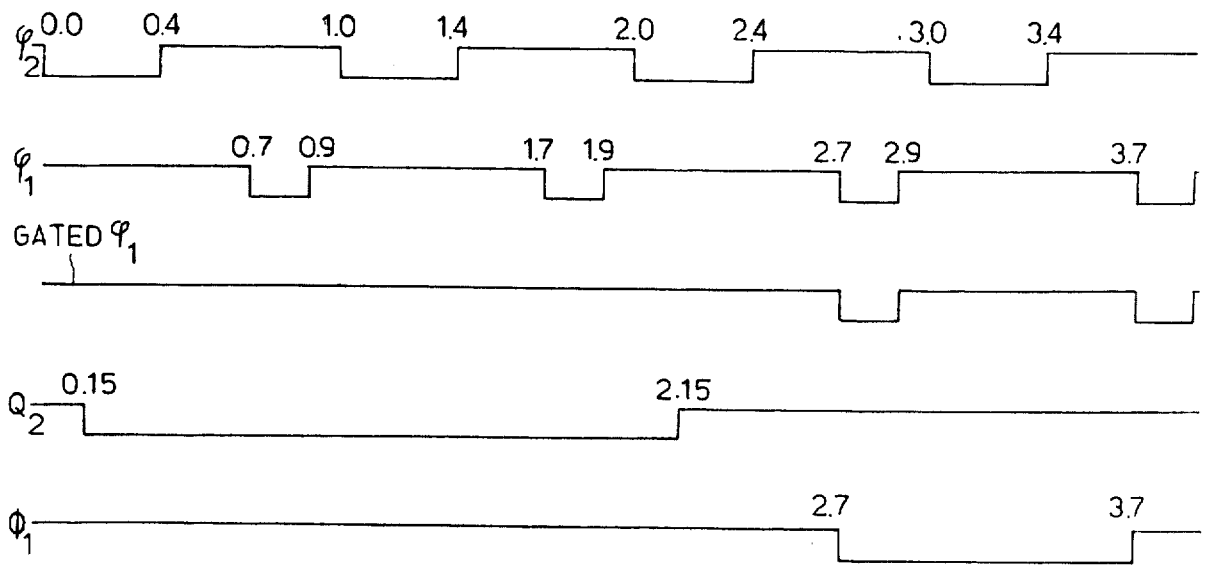
FIG. 8 is a timing diagram illustrating the phase relationships of the clock pulses applicable to the variation of FIG. 7.

FIG. 7 illustrates the foregoing variation applied to a MOS-transistor-implemeted low-speed to high-speed interface configuration, and FIG. 8 illustrates an example of the timing relationship of the clocks in the FIG. 7 circuit.

In FIG. 7, the data from the low-speed circuitry LSC7 is sampled by MOS transistor Q10 clocked by the low-speed clock $\phi_2$, stored and inverted in inverter $I_1$, then sampled in MOS transistor Q11 clocked by the gated high-speed $\phi_1$ clock, and finally stored and inverted in inverter $I_2$ before being passed to the high-speed circuitry HSC7. Inverters $I_1$ and $I_2$ are each of the MOS type described above with reference to FIG. 5, in which the inherent capacitance of the input MOS-transistor gate serves to store the sampled data received from its respective sampling transistor.

The gated high-speed clocks $\phi_1$ for clocking transistor Q11 are supplied from the output of NOR-gate $G_2$ having $\overline{\phi_1}$ (i.e. the absence of a high-speed clock $\phi_1$) as one input. The second input to NOR-gate $G_2$ is supplied from OR-gate $G_3$, the latter gate having the low-speed clocks $\phi_2$ at one input, and a second input from the low-speed circuit LSC7', sampled by transistor Q12 clocked by the low-speed clock $\phi_2$, and inverted by inverter $I_3$. The latter inverter is also of the MOS type described with reference to FIG. 5 whose inherent capacitance of the input transistor stores the data sampled from transistor Q12.

As shown in the timing diagram of FIG. 8, the first two of the high-speed $\phi_1$ clocks are suppressed in order to prevent data from being picked up by the high-speed $\phi_1$ clocked device too early after the leading edge of the low-speed clock $\phi_2$. It will also be seen that the time allowed to perform logical operations from the low-speed clock $\phi_2$ to the high-speed clock $\phi_1$ will be very close to the time allowed between the low-speed clocks $\phi_2$ and $\phi_1$.

Figure 4:
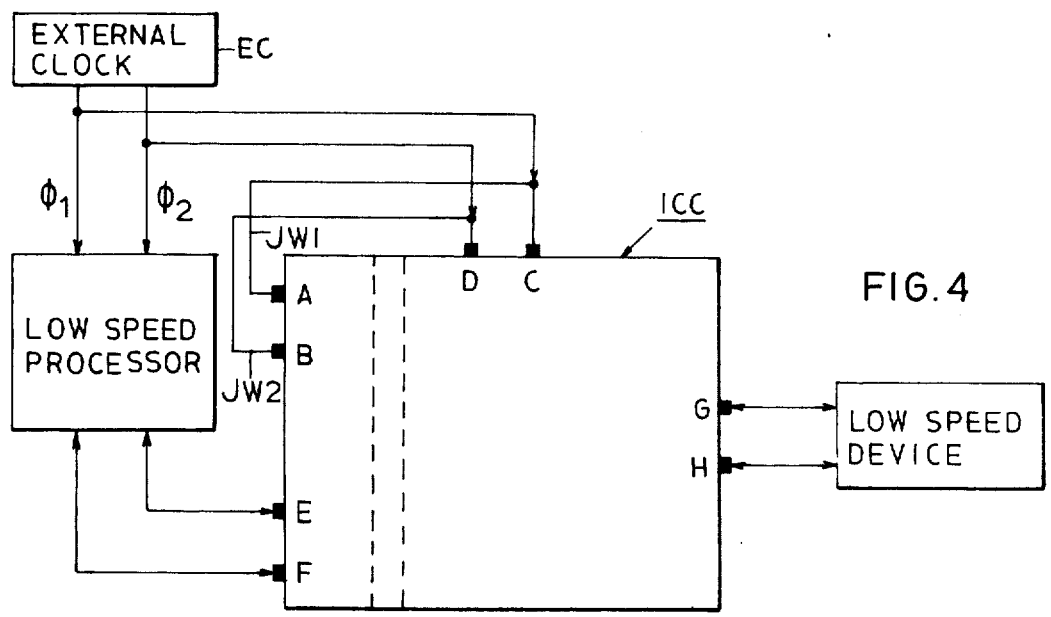
FIG. 4 illustrates how the chip of FIG. 1 may also be adapted for single-speed (i.e., low-speed) applications.

The timing example illustrated in FIG. 8 was used to interface a processor operating at high-speed clocks ($\phi_1$, $\phi_2$) of one MHz and a batch of controllers operating at low-speed clocks ($\phi_1$, $\phi_2$) of 250 KHz. In a second application in which the processor and controllers all operated at the low-speed clocks ($\phi_1$, $\phi_2$), the same integrated-circuit chip was used by tying the $\phi_1$ terminal to the $\phi_1$ terminal, and the $\phi_2$ terminal to the $\phi_2$ terminal, as illustrated in FIG. 4.

While the invention has been described specifically with reference to MOS LSI single-chip configurations, it will be appreciated that the invention could advantageously be used in other configurations; for example, other sampling devices could be used (e.g. bipolar transistors), and likewise other storage devices could be used (e.g. flip-flops). Further, the invention could also be advantageously used in interface circuitry not including logic functional units or not based on the two-phase clock configuration described above.

Many other variations, modifications and applications of the illustrated embodiment can be made within the spirit and scope of the invention as defined in the following claims.

What is claimed is:

1. In a data processing system having a first data-handling unit clocked by a low-speed clock and a second data-handling unit clocked by a high-speed clock, a single integrated circuit chip for transferring data in one direction either from said first unit to said second unit or from said second unit to said first unit, said integrated circuit chip comprising:

A. a first portion fabricated to include low-speed circuitry to be clocked by a low-speed clock for processing data supplied thereto by a said first unit, said low-speed circuitry being connected to a first data input terminal, a first data output terminal and a low-speed clock input terminal;

B. a second portion fabricated to include high-speed circuitry to be clocked by a high-speed clock for processing data supplied thereto by said second unit, said high-speed clock having a predetermined phase relationship to the low-speed clock and a pulse repetition frequency which is a whole number multiple of the pulse repetition frequency of the low-speed clock, said high speed circuitry being connected to a second data input terminal, a second data output terminal, and a high-speed clock input terminal; and C. a third portion fabricated to include interface circuitry for implementing the transfer of processed data in one direction from the low-speed circuitry to the high-speed circuitry or from the high-speed circuitry to the low-speed circuitry, said interface circuitry comprising:

i. a first section including (a) first sampling means connected to receive processed data from one of either said high-speed circuitry said low-speed circuitry and connected to be clocked along with the circuitry from which it receives said processed data, said first sampling means serving to sample said processed data when it is clocked and (b) first storage means connected to said first sampling means for storing the sampled processed data, and having an output representative of the stored processed data; and ii. a second section including a. second sampling means connected to receive the output of the first storage means and connected to be clocked along with the other of said high-speed circuitry or said low-speed circuitry, the second sampling means serving to sample the first storage means output when said second sampling means is clocked and b. second storage means connected to said second sampling means for storing the sampled first storage means output, and having an output representative of the stored sampled output, said second storage means being further connected to deliver its output to said other circuitry.

2. A single integrated-circuit chip according to claim 1, wherein the major portion of the chip is fabricated to include said low-speed circuitry.

3. A single integrated-circuit chip as defined in claim 1 wherein all of said sampling means include MOS transistors, and all of said storage means are constituted by the inherent capacitance of the insulated gates of further MOS transistors.

4. A single integrated-circuit chip as defined in claim 1 further comprising logic functional elements each having an input and an output connected between at least one of said sampling means and its respective storage means, the input of each element being connected to the respective sampling means and said output being connected to the respective storage means, for logically processing said sampled processed data or said sampled output before it is stored.

5. A single integrated circuit chip as defined in claim 1 further comprising circuitry for implementing the transfer of processed data in the other direction comprising:
  i. a third section including
    a. third sampling means connected to receive processed data from the other of said high-speed circuitry of said low-speed circuitry and connected to be clocked along with the circuitry from which it receives processed data, said third sampling means serving to sample said processed data when it is clocked and
    b. third storage means connected to said third sampling means for storing the sampled processed data, and having an output representative of the stored processed data and
  ii. a fourth section including
    a. fourth sampling means connected to receive the output of the third storage means and connected to be clocked along with the one of said high-speed circuitry or said low-speed circuitry, the fourth sampling means serving to sample the third storage means output when said fourth sampling means is clocked and
    b. fourth storage means connected to said fourth sampling means, for storing the sampled third storage means output and having an output representative of the stored sample output, said fourth storage means being further connected to deliver its output to said one of said high-speed circuitry or said low-speed circuitry.

6. A single integrated-circuit chip as defined in claim 5 in which said high-speed circuitry is to be clocked by a plurality of high-speed clocks and said low-speed circuitry is to be clocked by a plurality of low-speed clocks, said high-speed circuitry being connected to one high-speed clock input terminal for each high-speed clock by which it is to be clocked and said low-speed circuitry being connected to one low-speed clock input terminal for each low-speed clock by which it is to be clocked.

7. A single integrated circuit chip as defined in claim 6 in which the number of said high-speed clock input terminals is two and the number of low-speed clock input terminals is two.

8. A single integrated-circuit chip as defined in claim 7 in which said first sampling means and said fourth sampling means are connected to be clocked by different clocks of the one of the high or low speed clocks and said second sampling means and said third sampling means are connected to be clocked by different clocks of the other of the high or low speed clocks.

9. A single integrated circuit chip as defined in claim 8 in which the low-speed clocks are to have the same pulse repetition frequency and differ by a predetermined phase relationship and said high-speed clocks are to have the same pulse repetition frequency and differ by a predetermined phase relationship, the frequency of said high-speed clocks being a whole-number multiple of the frequency of the low-speed clocks.

10. A single integrated-circuit chip as defined in claim 9 further including means for connecting together said clock input terminals supplying said first sampling means and said second sampling means and further including means for connecting together said clock input terminals supplying said third sampling means and said fourth sampling means to adapt the chip for use with multi-phase, single-speed circuitry.

11. Interface circuitry for implementing the transfer of data between high-speed circuitry and low-speed circuitry, the low-speed circuitry to be clocked by two low-speed clocks having the same pulse repetition frequency and differing by a predetermined phase factor, and the high-speed circuitry to be clocked by two high-speed clocks having the same pulse repetition frequency a whole-number multiple of the pulse repetition frequency of the low-speed clocks and differing by a predetermined phase factor, said interface circuitry comprising:
  A. a first section including
    i. first sampling means connected to receive data from said high-speed circuitry and connected to be clocked along with said high-speed circuitry, said first sampling means serving to sample said data when it is clocked and
    ii. first storage means connected to said first sampling means for storing the sampled data, and having an output representative of the stored data; and
  B. a second section including
    i. second sampling means connected to receive the output of the first storage means and connected to be clocked along with said low-speed circuitry, the second sampling means serving to sample the first storage means output when said second sampling means is clocked and
    ii. second storage means connected to said second sampling means for storing the sampled output, and having an output representative of the stored sampled output, said second storage means being further connected to deliver its output to said low-speed circuitry; and
  C. a third section including
    i. third sampling means connected to receive data from said low-speed circuitry and connected to be clocked along with said low-speed circuitry, said third sampling means serving to sample said data when said third sampling means is clocked and
    ii. third storage means connected to said third sampling means for storing the sampled data, and having an output representative of the stored sampled data
  D. a fourth section including i. fourth sampling means connected to receive the output of the third storage means and connected to be clocked along with said high-speed circuitry, the fourth sampling means serving to sample the third fourth storage means output when said fourth sampling means is clocked and ii. storage means connected to said second sampling means for storing the sampled output, and having an output representative of the stored sampled output, said fourth storage means being further connected to deliver its output to said high-speed circuitry.

12. Interface circuitry according to claim 11, wherein the interface circuitry is fabricated on a single integrated-circuit chip, the chip including a pair of high-speed input terminals for the high-speed clocks and a pair of low-speed input terminals for the low-speed clocks.

13. A single integrated-circuit chip according to claim 12, wherein the chip comprises a further portion fabricated to include high-speed circuitry to be clocked by the high-speed clock, and a further portion fabricated to include low-speed circuitry to be clocked by the low-speed clock.

14. A single integrated-circuit chip according to claim 13, wherein the major portion of the chip is fabricated to include said low-speed circuitry.

15. A single integrated-circuit chip as defined in claim 14, further comprising means for connecting together said clock input terminals supplying said first sampling means and said second sampling means, and further comprising means for connecting together said clock input terminals supplying said third sampling means and said fourth sampling means, to adapt the chip for use with multiphase single speed circuitry.

16. A single integrated-circuit chip as defined in claim 14 wherein all of said sampling means include MOS transistors, and all of said storage means are constituted by the inherent capacitance of the insulated gates of further MOS transistors.

17. A single integrated circuit chip as defined in claim 14 further comprising logic functional elements each having an input and an output connected between at least some of said sampling means and their respective storage means, with each input being connected to one of said sampling means and each output being connected to the respective storage means for logically processing said sampling data or said sampled output before it is stored.

18. In a data processing system having low-speed circuitry to be clocked by a low-speed clock and high-speed circuitry to be clocked by a high-speed clock having a predetermined phase relationship to the low-speed clock and a pulse repetition frequency which is a whole number multiple of the pulse repetition frequency of the low-speed clock, interface circuitry for implementing the transfer of data either from the low-speed circuitry to the high-speed circuitry or from the high-speed circuitry to the low-speed circuitry, said interface circuitry comprising:

A. a first section including
 i. first sampling means connected to receive data from one of either said high-speed circuitry or said low-speed circuitry and connected to be clocked along with the circuitry from which it receives data, said first sampling means serving to sample said data when it is clocked and
 ii. first storage means connected to said first sampling means for storing the sampled data, and having an output representative of the stored data; and B. a second section including
 i. second sampling means connected to receive the output of the first storage means and connected to be clocked along with the other of said high-speed circuitry or said low-speed circuitry, the second sampling means serving to sample the said first storage means output when said second sampling means is clocked and (ii) second storage means connected to said second sampling means for storing the sampled output, and having an output representative of the stored sample output, said second storage means being further connected to deliver its output to said other circuitry.

19. In a data processing system having a first data-handling unit clocked by a low-speed clock and a second data-handling unit clocked by a high-speed clock, a single large-scale integrated circuit MOS chip for transferring data between said first unit and said second unit, said integrated circuit MOS chip comprising:

A. a first portion fabricated to include low-speed circuitry for processing data supplied thereto by said first unit, said low-speed circuitry being connected to a first data input terminal, a first data output terminal and two low-speed clock input terminals, said low-speed circuitry to be clocked by a pair of low-speed clocks having the same pulse repetition frequency and differing by a predetermined phase relationship;

B. a second portion fabricated to include high-speed circuitry for processing data supplied thereto by said second unit, said high-speed circuitry being connected to a second data input terminal, a second data output terminal and two high-speed clock input terminals, said high-speed circuitry to be clocked by a pair of high-speed clocks having the same pulse repetition frequency a whole-number multiple of the pulse repetition frequency of the low-speed clocks and differing by a predetermined phase relationship; and C. a third portion formed to include interface circuitry for implementing the transfer of processed data between the high-speed circuitry and the low-speed circuitry, said interface circuitry including:
 i. a first section including
  a. first sampling means connected to receive processed data from said high-speed circuitry and connected to be clocked along with said high-speed circuitry, said first sampling means serving to sample said processed data when it is clocked and
  b. first storage means connected to said first sampling means for storing the sampled processed data, and having an output representative of the stored processed data; and
 ii. a second section including
  a. second sampling means connected to receive the output of the first storage means and connected to be clocked along with said low-speed circuitry, the second sampling means serving to sample the first storage means output when said second sampling means is clocked and
  b. second storage means connected to said second sampling means for storing the sampled output, and having an output representative of the stored sampled output, said second storage means being further connected to deliver its output to said low-speed circuitry; and iii. a third section including a. third sampling means connected to receive processed data from said low-speed circuitry and connected to be clocked along with said low-speed circuitry, said third sampling means serving to sample the processed data when it is clocked and b. third storage means connected to said third sampling means for storing the sampled processed data, and having an output representative of the stored processed data; and iv. a fourth section including a. fourth sampling means connected to receive the output of the third storage means and connected to be clocked along with said high-speed circuitry, the fourth sampling means serving to sample the third storage means output when said second sampling means is clocked and b. second storage means connected to said second sampling means for storing the sampled output, and having an output representative of the stored sample output, said fourth storage means being further connected to deliver its output to said high-speed circuitry.

* * * * *